(No Model.) 4 Sheets—Sheet 2.

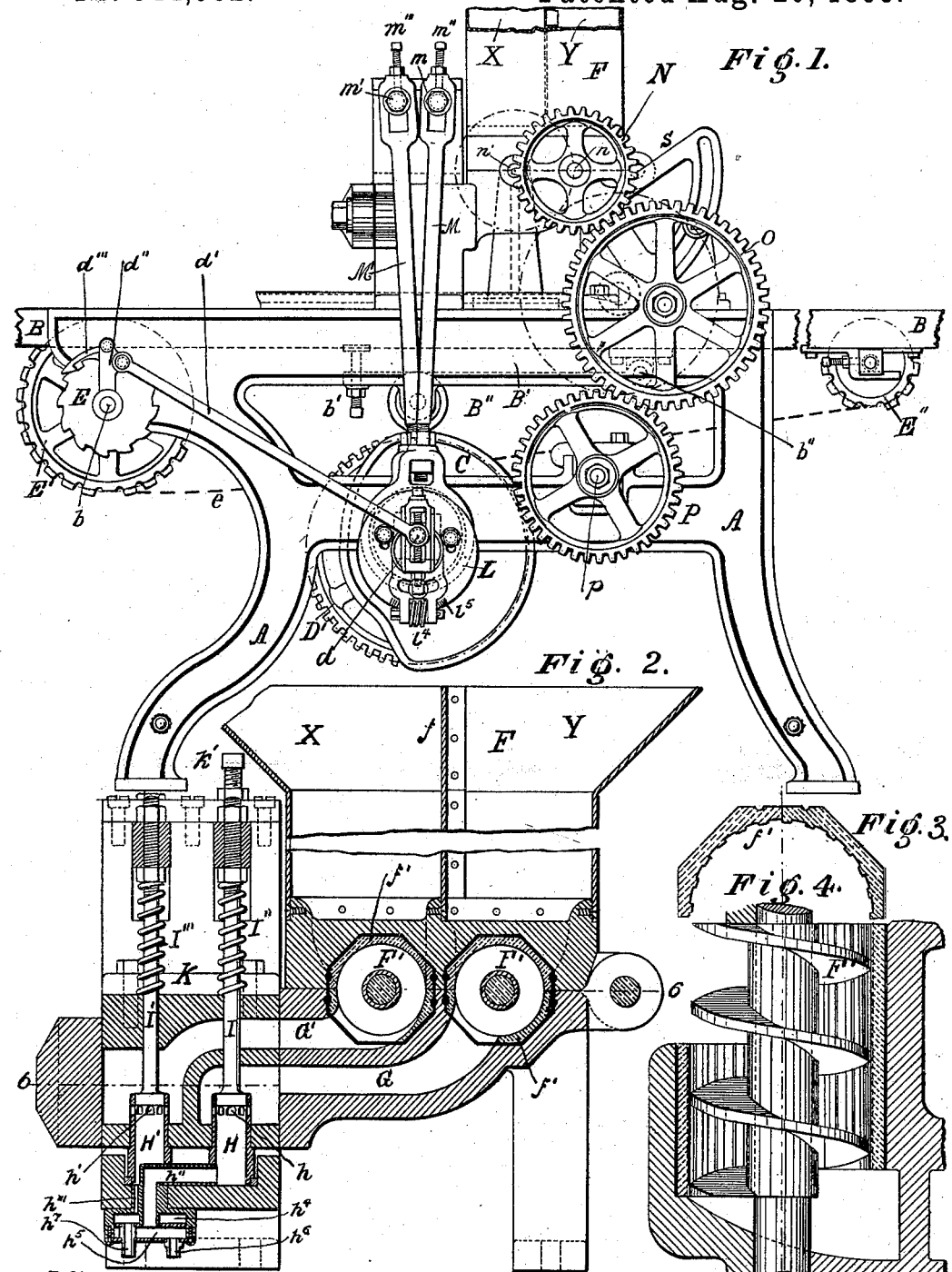

A. W. COPLAND.
DEPOSITING MACHINE.

No. 544,962. Patented Aug. 20, 1895.

Witnesses
L. Shields
J. S. Early

Inventor
A. W. Copland
By his Attorney
Frank O. Loveland (No Model.) 4 Sheets—Sheet 3.

A. W. COPLAND.
DEPOSITING MACHINE.

No. 544,962. Patented Aug. 20, 1895.

Witnesses:
L. Shields
J. B. Early

Inventor
A. W. Copland
By his Attorney
Frank O. Loveland (No Model.) 4 Sheets—Sheet 4.

A. W. COPLAND.
DEPOSITING MACHINE.

No. 544,962. Patented Aug. 20, 1895.

Witnesses
L Shields
J. S. Early.

Inventor
A. W. Copland
By his Attorney
Frank O Loveland

UNITED STATES PATENT OFFICE.

ALEXANDER W. COPLAND, OF CINCINNATI, OHIO.

DEPOSITING-MACHINE.

SPECIFICATION forming part of Letters Patent No. 544,962, dated August 20, 1895.

Application filed August 22, 1894. Serial No. 520,985. (No model.)

*To all whom it may concern:*

Be it known that I, ALEXANDER W. COPLAND, a citizen of the United States, residing in the city of Cincinnati, Hamilton county, Ohio, have invented certain new and useful Improvements in Depositing-Machines, of which the following is a specification.

My invention relates to that class of depositing-machines used by bakers to form and prepare cakes and other like articles for the oven.

The primary object of my invention is to furnish a depositing-machine whereby two or more substances—such as dough, jellies, icings, or candies—may be deposited in such way that one substance becomes an entire or partial envelope for another substance, as desired. There are also new features in the construction of my duplex depositing-machine which are applicable to other classes of machinery.

My invention consists in the several parts and combinations of parts hereinafter more fully set forth and claimed.

Figure 5:
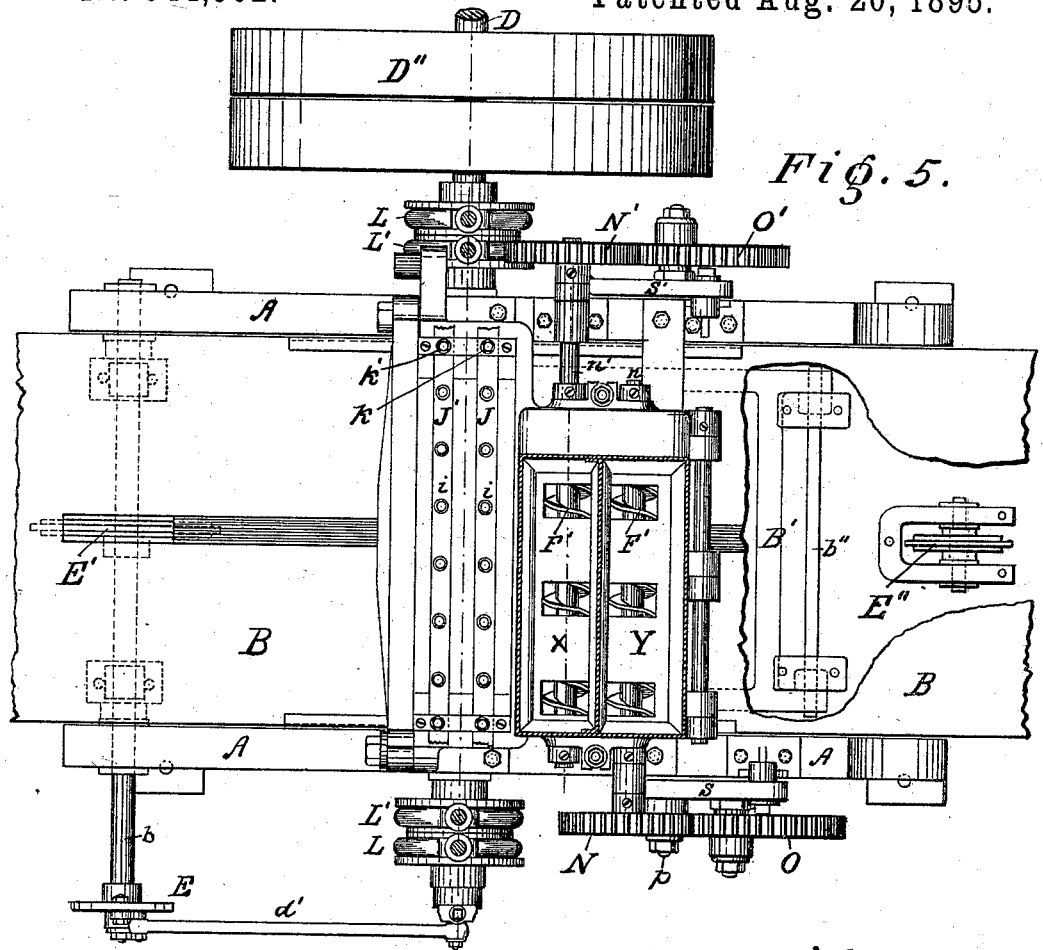
Figure 6:
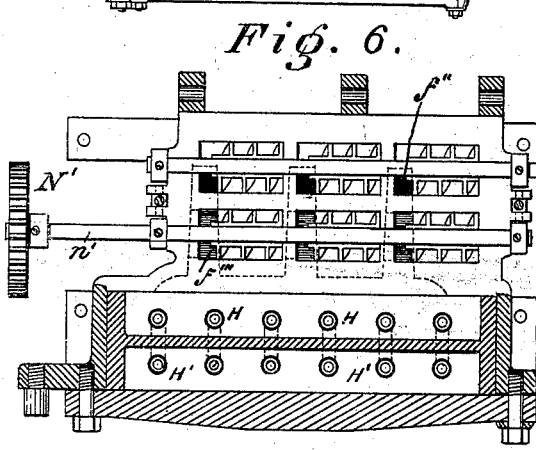
Figure 7:
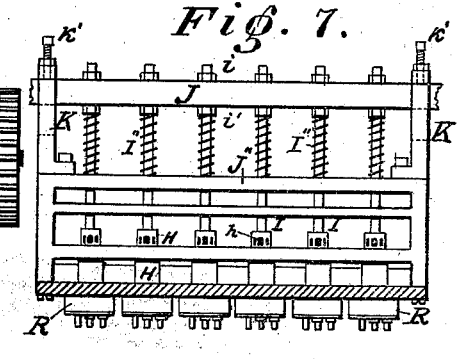
Figure 8:
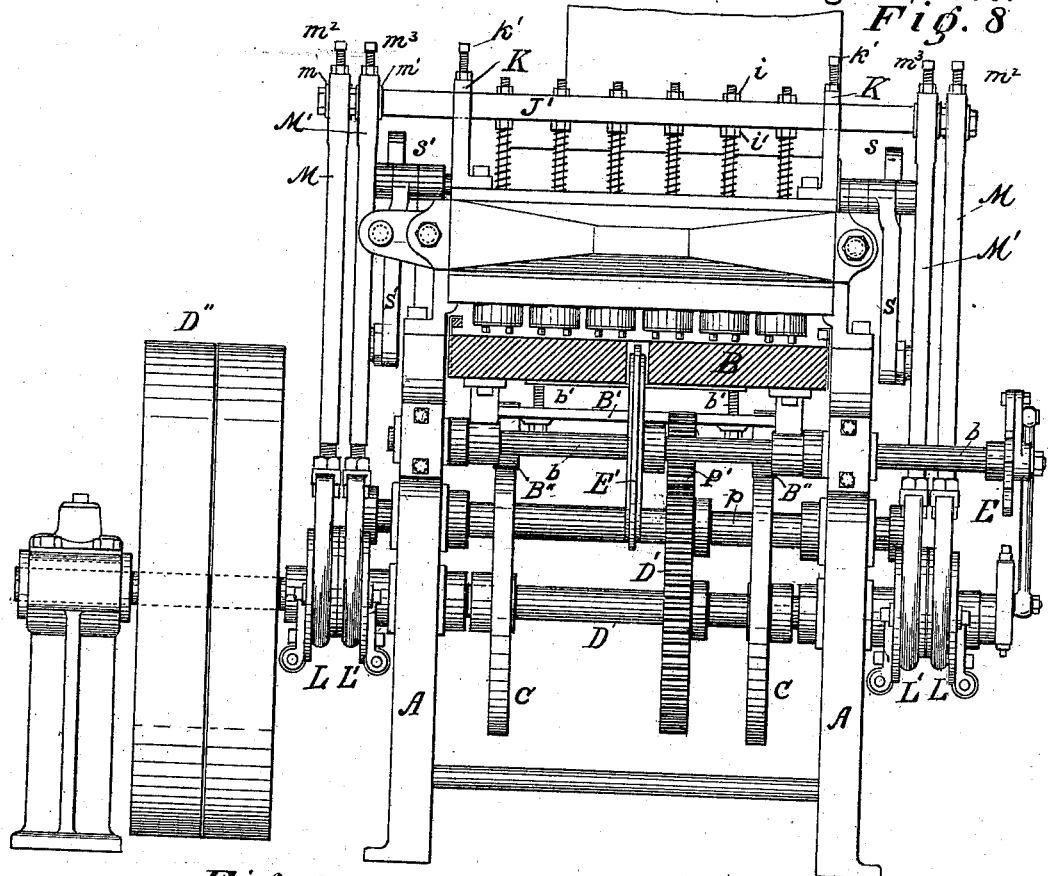
Figures 9, 10, 11, 12:
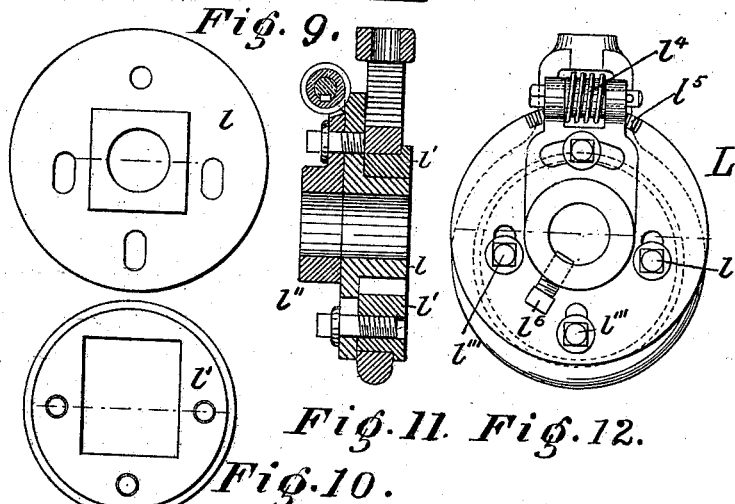
Figure 13:
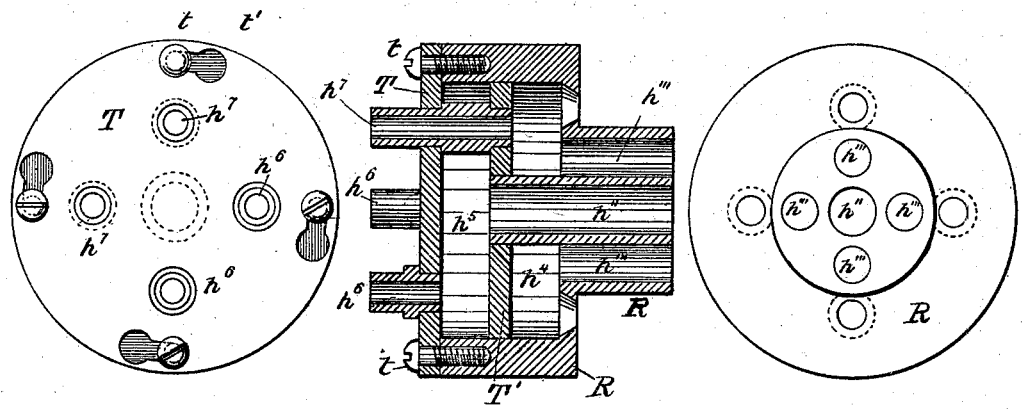
Figure 14:
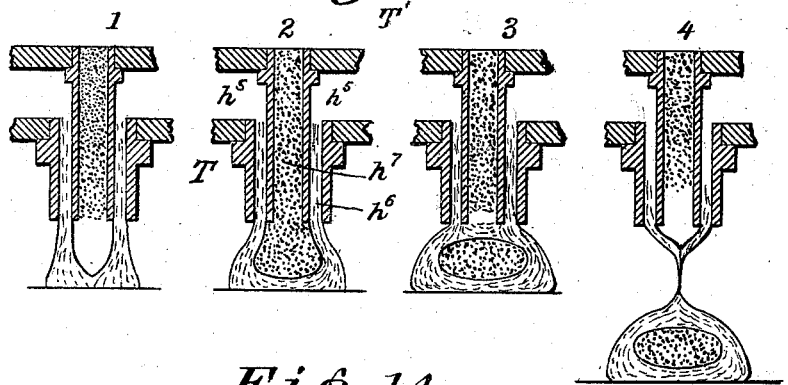
Figure 15:
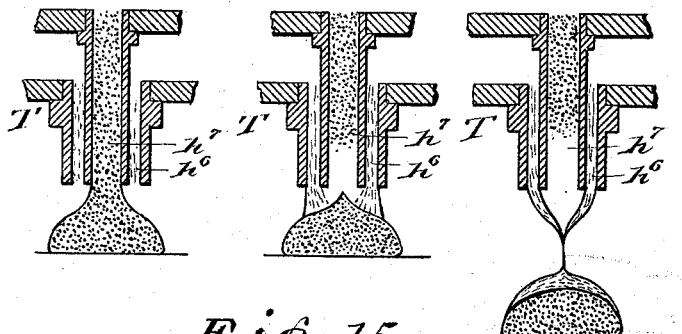

Referring to the drawings, Figure 1 is a side elevation of one of my machines. Fig. 2 is a longitudinal vertical section of parts of the same above the table. Fig. 3 is a detail of the interior surface of the worm-case. Fig. 4 is a detail of the worm. Fig. 5 is a top plan view. Fig. 6 is a detail of the feed device. Fig. 7 is a detail of the cutter-head. Fig. 8 is an end elevation. Figs. 9, 10, 11, and 12 are details of the adjustable eccentrics. Fig. 13 is a detail of the cutter, showing detachable bottom plate, section of cutter, and top plate, respectively. Fig. 14 is a section of a cutter, showing in different stages the passage of two substances into a cake having one substance wholly embedded in the other. Fig. 15 is the same, showing cakes having one substance partially covered by the other.

A is a framework for the machine.

B is an adjustable table pivoted at $b$ and adjusted by means of a set-screw $b'$, taken through a movable arm B', pivoted to the table at $b''$. The arm B' carries a bearing-wheel B'', adapted to be supported by a cam C, mounted on a main driving-shaft D. A part of the periphery of this cam is an arc of a circle. While the bearing-wheel B'' is passing over this part of the cam the table is held at uniform height. During this period the dough is deposited on the pan. While the bearing-wheel B'' is traveling over the remaining portion of the cam the table is lowered, thereby breaking the dough away from the cutter.

Mounted on the main shaft D is a crank-arm $d$, to which is mounted one end of a connecting-rod $d'$, connected with plate $d''$, pivoted at $b$. On the plate $d''$ is a pawl $d'''$, adapted to actuate a ratchet-wheel E, rigidly connected to a sprocket-wheel E'. A sprocket-chain $e$ passes over the sprocket-wheel E' through the table over sprocket-wheel E''. The purpose of the chain is to carry the pan under the depositing device of the machine. The main shaft actuates the sprocket-wheel by means of the pawl and ratchet-wheel, leaving the pan in position for a deposit, while the crank-arm is making the idle part of its turn, then carrying it along to receive a new deposit.

F is a hopper divided into two parts X and Y by a partition $f$. These parts are adapted to receive the two substances to be used, respectively. Within each part of the hopper is mounted a worm F' for the purpose of forcing the substance down through the hopper into the passages G and G'. I prefer to make the inner surface $f'$ of the worm-case corrugated, as shown in Fig. 3, for the reason that the corrugated surface will tend to hold the material from turning with the worm and will not form any obstruction to the motion of the substance parallel with the axis of the worm.

Each worm-shaft is operated by an individual gearing. The means for actuating one worm-shaft $n$ consists of spur-wheels N O P, the wheel P being rigidly connected to shaft $p$, which is actuated by gear-wheel P' on shaft $p$ and gear-wheel D' on the main shaft D, which is provided with belt-wheel D''. The means for actuating the other worm-shaft $n'$ consists of spur-wheels N' O' P', the wheel (not shown in drawings) being rigidly secured to the opposite end of shaft $p$. The wheels O and O' are mounted in quadrants S S', pivoted to the worm-shafts at $s\ s'$. By this arrangement the velocity of the worm-shafts may be adjusted by inserting wheels P or P' of different sizes. It is not necessary that both worms have the same velocity. For the purpose of more evenly feeding the substances out of the hoppers I prefer to put several short worms on each shaft, as shown in Fig. 6, having as many outlets $f''$ into the passages G and G' as there are worms.

From G and G' the substances pass through the ports $h\ h'$ into the piston-cylinders H H' of the cutter, thence through the passages $h''$ and $h'''$ into the cutter-reservoirs $h^5$ and $h^4$, respectively, from which reservoirs they pass out of the cutter through the cutter-tubes $h^6$ and $h^7$, respectively.

I I' are piston-rods carrying pistons adapted to work in the cylinders H and H' and force the substances which have passed the ports in the cylinders toward the cutter-tubes. These pistons are adapted to force the two different substances, and are usually placed in gangs, as shown on Fig. 7, there being a gang of pistons I' and a gang of pistons I. The arrangement of these gangs is shown in Fig. 6 near the bottom of the figure. These pistons are mounted in cross-heads J and J', respectively. The piston-rods are individually adjustable in the cross-heads by means of set-nuts $i$ and $i'$. Coiled springs I'' and I''' bear against the set-nuts $i'$ and cross-bar J'' on the cutter-head. The tendency of the springs is to force the cross-heads carrying the piston-rods upward to open the ports $h$ and $h'$. The cross-heads J and J' work in brackets K and K and are operated by means of eccentrics L L and L' L'. The eccentrics L L and L' L' are mounted on the main shaft D. The eccentrics L L operate the cross-head J and the eccentrics L' L' operate the cross-head J'.

The eccentrics L and L' are similarly constructed. (See Figs. 9, 10, 11, and 12.) The eccentrics are made in three parts, the body $l$, adapted to take loosely about the axle or shaft, the eccentric-plate $l'$, and a collar $l''$, adapted to be rigidly fastened to a shaft by set-screw $l^6$. The degree of eccentricity is adjusted by means of set-screws $l'''\ l'''$, working in slots. This adjustment regulates the length of the stroke of the eccentric-rods. The time or position at which the eccentricity acts is adjusted by means of a worm $l^4$, mounted on the collar $l''$ and adapted to work on the rack $l^5$ on the body $l$.

The cross-head J is connected with the eccentrics L L by means of rods M M, and the cross-heads J' are connected with the eccentrics L' L' by means of rods M' M'. At the upper end of the rods M M and M' M' are boxes $m\ m'$, working in slots, and are adjusted by set-screw $m''$ and $m'''$. By this means a part or the whole of the eccentricity of the eccentrics L and L' is utilized, thereby regulating the distance the piston-rods travel. The size of the openings of the ports admitting the substance into the piston cylinders is regulated by means of adjustable set-screws $k\ k$ and $k'\ k'$, which adjust the height of the cross-heads J J', thereby adjusting the limit or upward motion of the pistons I I'. In this way the pistons may be adjusted to partially cover or leave entirely free the ports $h$ and $h'$.

The design of the cake made of the substances deposited depends upon the arrangement of the cutter-tubes $h^6$ and $h^7$. In Figs. 13 and 14 I have shown two designs of cutters. In Fig. 13 the cutter consists of the passages $h''$ and $h'''$, which deliver the two substances used into the cutter-reservoirs $h^4$ and $h^5$, respectively. The reservoirs $h^4$ and $h^5$ are divided by partition-plate T', adapted to take into the hollow casing R. The bottom plate T, having therein the cutter-tubes $h^6$ and $h^7$, is adapted to take over the lower end of the casing R, and is fastened thereto by set-screws $t$, working in slots $t'$. The plate T is rigidly fastened to the partition-plate T' by means of the cutter-tubes $h^7$, or by any suitable means, and readily detachable from the casing R. The object of this arrangement within the cutter-case R is to form a reservoir for each substance, and by passing tubes through the plates T and T' to deliver the two substances in any desired design.

In Fig. 13 I have shown a different arrangement of cutter-tubes from that shown in Fig. 14. In Fig. 14 the tube $h^7$ delivers through the tube $h^6$. It is obvious that the arrangement of the tubes conducting the two materials from their respective reservoirs may be multiplied indefinitely.

The operation of my machine is as follows: The power is applied to the main shaft D by means of a belt on the belt-wheel D''. In using the two substances—for example, dough and jam—the dough is put in the hopper X and the jam is put in the hopper Y. The worms tend to force the dough and jam from the bottom of the hoppers. The dough is delivered into the passage G' and the jam into the passage G. The dough passes through the ports $h'$ into the cylinder H', and the jam passes through the ports $h$ into the cylinder H. The pistons are at their upward limit of motion. If it is desired to wholly embed the jam within the dough the eccentric L and its rod M are adjusted by means of the worm $l^4$ to start before the eccentric L' starts. By adjusting the set-screw $m'''$ lower than set-screw $m''$ the stroke of piston-rod I' will commence sooner than the stroke of the piston-rod I, (the two eccentrics having the same degree of eccentricity and length of arm,) because the eccentric L starts before the eccentric L', and the downward stroke of the piston I will be completed before the downward stroke of piston I', because there will be less lost motion in the movement of the rod M' than in M. With the adjustment just described it is clear that the dough will start first, being forced outward by the piston working in cylinder H'. With a suitable adjustment of the set-screws $m''$ and $m'''$ the piston-rod I will begin to descend soon after piston I', forcing the jam through tube $h^7$, Fig. 14, and then the piston-rod I, having completed its stroke in shorter time than piston I', will begin to ascend, sucking up the jam, thereby breaking it from the jam deposited. Meanwhile the piston I' continues its stroke, still depositing dough, as seen at 3, Fig. 14, until it completes its stroke, at which time the bearing-wheel B'' has passed the circular periphery of the cam C, and the table carrying the pan is lowered and the dough broken, as shown at 4, Fig. 14, leaving the dough entirely covering the jam. The two gangs of cutters having deposited one series of cakes, the pan is moved forward by the sprocket-chain operated by the pawl-and-ratchet wheel, as before described, to place it in position to receive another series of cakes, when the operation before described is repeated.

If it is desired to place icing on cakes, the icing is placed in the hopper X and the cake-dough is placed in hopper Y, and the adjustment of the eccentrics and set-screws are reversed—that is, so that piston-rod I completes its stroke before piston I' begins its stroke. The operation of icing a cake is illustrated in Fig. 15.

When it is desired to use a cutter like that shown in Fig. 13, the two pistons are adjusted to work at the same time. The cutter-reservoirs and hopper-partitions may be increased indefinitely.

It is obvious that by using my machine I can place coating on candies, like chocolate-creams, or icing on cakes, or wholly embed jellies within cakes, or manufacture cakes composed of two or more substances arranged in special designs with reference to the substances used, or in working clay or other substances, as in the manufacture of mosaic tiles, &c.

I claim—

1. In a depositing machine two or more cylinders adapted to receive different substances, pistons working therein, one piston adapted to make a full stroke in one direction, while another piston is making a partial stroke in the same direction, whereby the delivery of the substances is relatively controlled automatically, cutter or delivery tubes connected with the outlets of the piston cylinders, substantially as and for the purpose described.

2. The combination in a depositing machine of two or more cylinders adapted to receive different substances, pistons working therein, means for adjusting the pistons relatively to each other, whereby the delivery of the substances is automatically controlled, and cutter or delivery tubes connected with the outlets of the piston-cylinders, substantially as and for the purpose described.

3. The combination in a depositing machine of two or more cylinders adapted to receive different substances, pistons working therein, eccentric rods adapted to actuate the pistons and provided with adjustable sliding boxes, whereby the length of stroke of the pistons is adjusted, and mechanism for imparting motion to the eccentric rods, substantially as and for the purpose described.

4. The combination in a depositing machine of two or more cylinders adapted to receive different substances, pistons working therein, eccentric rods adapted to actuate the pistons and provided with eccentrics having the position of eccentricity therein adjustable, whereby the time at which the eccentric rods move is regulated, and mechanism for imparting motion to the eccentric rods, substantially as and for the purposes described.

5. The combination in a depositing machine of two or more cylinders adapted to receive different substances, pistons working therein, eccentric rods adapted to actuate the pistons, eccentrics adapted to actuate the eccentric rods, having the degree of eccentricity therein adjustable whereby the length of the stroke of the eccentric rods may be adjusted and mechanism for imparting motion to the eccentric rods, substantially as and for the purpose described.

6. The combination in a depositing machine of two or more cylinders adapted to receive different substances, pistons working therein, eccentric rods adapted to actuate the pistons, eccentrics adapted to actuate the eccentric rods, and having the degree and position of eccentricity therein adjustable, and mechanism for imparting motion to the eccentrics, substantially as and for the purpose described.

7. The combination in a depositing machine of two or more cylinders adapted to receive different substances, pistons working therein, eccentric rods adapted to actuate the pistons, adjustable sliding boxes in the eccentric rods, whereby the length of the stroke of the pistons may be adjusted, separable eccentrics adapted to actuate the eccentric rods, and means of adjusting the degree and position of eccentricity therein, substantially as and for the purpose described.

8. The combination in a depositing machine of a hopper having two or more divisions, each division provided with a worm, whereby the substance in that division is forced into a cylinder, cylinders, pistons working therein, eccentric rods adapted to actuate the pistons, adjustable sliding boxes in the rods, adjustable eccentrics adapted to actuate the rods, and a driving shaft whereby motion is imparted to the eccentrics, substantially as and for the purpose described.

9. A hopper having two or more divisions, each division provided with a worm case, having an interior surface thereof corrugated parallel with the axis of the worm, a worm working therein, whereby the substances in each division of the hopper are forced into cylinders respectively, cylinders, pistons working therein, eccentric rods, adjustable sliding boxes therein, adjustable eccentrics adapted to actuate the eccentric rods, and a driving shaft adapted to actuate the eccentrics, substantially as and for the purpose described.

10. The combination in a depositing machine of a hopper having two or more divisions, each division provided with a worm actuated by adjustable gearing, whereby the substances in each division are forced into cylinders respectively, cylinders, adjustable pistons working therein, eccentric rods adapted to actuate the pistons, adjustable sliding boxes in the eccentric rods, eccentrics adapted to actuate the rods, the driving shaft adapted to actuate the eccentrics and provided with a crank arm, a connecting rod mounted thereon adapted to actuate a sprocket wheel carrying a sprocket chain, a cam mounted on the driving shaft adapted to support an adjustable table, substantially as and for the purpose described.

11. In a depositing machine a cutter consisting of a cutter case having therein two or more reservoirs, stationary tubes connected therewith and extending without all the reservoirs and a detachable bottom plate having partition or partitions attached thereto, substantially as and for the purpose described.

12. The combination in a depositing machine of two or more cylinders adapted to receive different substances, pistons working therein, means for adjusting the pistons relatively to each other, each piston delivering a substance into a cutter consisting of a cutter case having therein two or more reservoirs, tubes connected therewith and extending without all the reservoirs, substantially as and for the purpose described.

ALEXANDER W. COPLAND.

Witnesses:
NATHAN R. PARK,
L. SHIELDS.